Figure 1:
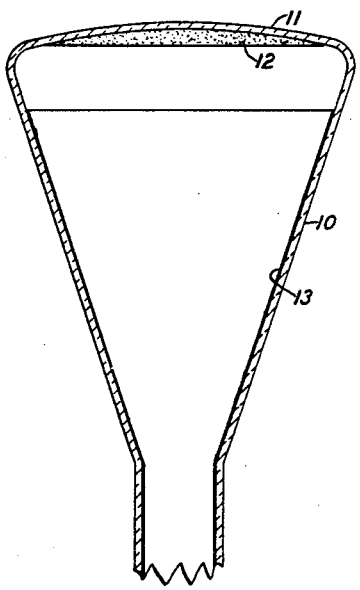

Aug. 12, 1941.    C. J. CALBICK ET AL    2,252,552
LUMINESCENT COATING
Filed July 5, 1940

INVENTORS C.J. CALBICK
J.C. COOK
BY
ATTORNEY

Patented Aug. 12, 1941

2,252,552

UNITED STATES PATENT OFFICE 2,252,552

LUMINESCENT COATING

Chester J. Calbick, Chatham, and John C. Cook, Westwood, N. J., assignors to Bell Telephone Laboratories, Incorporated, New York, N. Y., a corporation of New York Application July 5, 1940, Serial No. 343,994

12 Claims. (Cl. 250—81)

This application relates to luminescent screens or coatings and more particularly to fluorescent screens for cathode ray tubes.

It is an object of this invention to provide a fluorescent screen or coating having an improved binder.

In the manufacture of cathode ray tubes, it is frequently desired to use as screen material certain fluorescing powders, such as mixtures of zinc and cadmium sulphides activated with activators such as copper and manganese, this particular mixture producing a white luminescence. These powders lose their fluorescent efficiency when baked appreciably above 350° C. and since it is desired to coat, in the usual case, the conical walls of a cathode ray tube with aquadag for a final anode member, which coating must be baked at 450° C. and over to remove volatile impurities, the fluorescent screen must be made after the aquadag has been baked on in order that the efficiency of these powders be maintained. Moreover, the bulb must be baked to anneal the glass and to outgas after the assembly. This means that the screen must be satisfactory the first time it is made, as recoating a bulb which has an unsatisfactory screen requires thorough cleaning of the bulb interior, application and baking-on of the aquadag, and finally another coating of the fluorescent screen.

In one known method of applying fluorescent material to its supporting member by utilizing an organic sticky binder for the fluorescent material, a smooth coating is obtained but there is not much adherence between the screen and the supporting member due to the evaporation of the organic binder. In another form of fluorescent screen known to the prior art, a more permanent binding material such as sodium silicate is used as a binder, which screen has good adherence but is non-uniformly coated over the surface of the supporting member.

It is a further object of this invention to produce a fluorescent screen which has a smooth coating over the surface of the supporting member and also is firmly adherent to the supporting member.

These objects are accomplished in the present invention by providing for the purpose of binding fluorescent material to its supporting structure a binding cement comprising a "permanent" binding material, such as a silicate or a borate which is soluble in water at room temperatures, a sulphur compound which is unstable at temperatures under 500° C. of one or more elements from the group comprising the alkali and the alkaline earth metals and the ammonium radical ($NH_4$) (for the purposes of this description the ammonium radical is considered as an "element"), and a "tacky" substance, such as a dihydric or trihydric alcohol, to inhibit evaporation of water from the binder. In a preferred form of the invention given by way of example, the binder comprises a mixture of potassium thiosulfate, sodium silicate, glycerine and water. The sodium silicate is used to produce a good permanent binder, and the glycerine to present a "tacky" surface to inhibit evaporation of the water. The surface remains "tacky" for twenty to thirty minutes and thus more time is allowed for adding the fluorescing powders. The addition of glycerine to a binder comprising sodium silicate alone has one marked disadvantage, that is, the organic vapors from the glycerine produce a reducing atmosphere which causes a deposition of zinc and cadmium from the fluorescing powders, thus ruining the fluorescent screen. In some cases this reducing atmosphere can be avoided by heating at a temperature of 100° C. or lower and providing proper ventilation but in many tubes it is entirely impossible to have such a ventilation, and thus the reducing atmosphere is present. The present invention is based upon the discovery that certain unstable sulphur compounds such as, for example, sodium or potassium thiosulfate, will prevent the reducing atmosphere formed by glycerine or other organic vapors from causing the reduction of the metallic sulphides comprising the fluorescing powders.

The binding cement is made up just prior to use as the potassium or sodium thiosulfate acts slowly to precipitate the silicate. A thin film of this cement is applied to the screen surface with an air brush using a very fine spray and an excess of air to remove the bulk of the water. The fluorescing powders are then poured onto the sticky surface and caused to flow back and forth across the screen. In prior art fluorescent screens, it has been necessary to carefully sift or dust the fluorescent material onto the binder in order to form a uniform layer. Such is not the case when the binder of the present invention is used, as the fluorescent material can be poured on and still coat uniformly. The excess of the fluorescent powders is poured out and the coating dried in an oven from 100° to 150° C., for a period of about thirty minutes. The bulb is then baked at from 300° to 400° C. for about one hour.

The binder of this invention makes possible a fluorescent screen with excellent mechanical properties and which has a superior resistance to deleterious effects encountered in baking, particularly in the presence of organic vapors.

Figure 2:
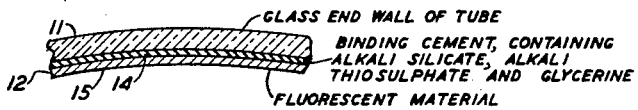

The invention will be more readily understood by referring to the following description taken in connection with the accompanying drawing forming a part thereof in which:

Fig. 1 shows one end of a cathode ray tube containing a fluorescent screen made according to this invention; and Fig. 2 shows a cross-section of a portion of the fluorescent screen of Fig. 1.

Referring more specifically to the drawing, Fig. 1 shows a portion of a cathode ray tube 10 on the end wall 11 of which is coated a fluorescent screen 12. On the walls of the tube 10 near the fluorescent screen is preferably coated a layer of aquadag 13 or any other suitable conducting coating.

Fig. 2 shows an enlarged view of a portion of a fluorescent screen 12 on the end wall of the tube 11. The screen 12 comprises a layer 14 of a binding cement and a layer of fluorescent material 15. The drawing in Fig. 2 is merely schematic as it is obvious that the binding cement and the fluorescent materials are not in smooth layers, there being close intermingling between these two elements.

The binding cement preferably consists of the following materials in indicated proportions by weight: sodium or potassium thiosulfate 100 parts, sodium or potassium silicate 1½ to 6 parts, glycerine 50 to 110 parts, and water 400 parts. The glycerine inhibits the evaporation of water and causes the mixture to remain "tacky" for from twenty to thirty minutes thus giving more time to apply the fluorescent powders. The binder is applied in the form of minute droplets to the surface to be coated. The binder without glycerine coalesces into larger drops and dries quickly and non-uniformly. If the binder contains glycerine the droplets remain separated from each other thus producing a uniform final screen coating. While glycerine has been used in the past, it has been found that in the usual binding cement composition the glycerine acts during subsequent baking to reduce the sulphides in the fluorescent phosphors. Accordingly, in the case where it is desired to use zinc and cadmium sulphides to produce a white fluorescent screen, the glycerine tends to reduce these sulphides to produce metallic zinc and cadmium with a consequent darkening of the screen. When sodium or potassium thiosulfate, for example, is used, however, this reduction is prevented. While it is not definitely known how the thiosulfate prevents the reducing action, it is believed to be caused by the fact that a thiosulfate is an unstable sulphur compound which produces a sulphur atmosphere which tends to prevent the zinc and cadmium sulphides from being reduced. For this reason it is within the scope of this invention to use any unstable sulphur compound of an alkali or alkaline earth or ammonium radical base or any combination thereof, such as a potassium sodium compound, in place of the sodium or potassium compound. By "unstable" is meant unstable under about 450° to 500° C. as the fluorescent materials customarily used begin to oxidize and change color at about this approximate upper limit. Thus sulphates and sulphides would be too stable, but some sulphites may be used.

The main action of the thiosulfate is not believed to be primarily the prevention of the formation of the reducing atmosphere. It is probable that the action is protective rather than preventive. It is possible—indeed probable—that there is some preventive action which chemically would be a combination of some of the decomposition products of the thiosulfate with the glycerine to form volatile compounds which are not reducing. Primarily, however, the effect is believed to be a coating of the fluorescent particles with thin layers of the decomposition products of the thiosulfate. In the case of sodium or potassium thiosulfate, for example, the effective components of these thin layers are probably sodium or potassium sulphides ($Na_2S$ or $K_2S$) and sulphur itself. The sulphur may be in atomic form.

The thiosulfates of the alkali (Li, Na, K, Rb, Cs) and alkaline earth (Mg, Ba, Ca, Sr) metals in general decompose on heating to form a complex aggregate consisting of sulphate, sulphite, sulphide, several polysulphides and sulphur. The temperature of decomposition naturally varies with the particular metal of which the thiosulfate is formed but lies between 100° C. and 250° C. By polysulphide is meant a sulphide containing more sulphur than that corresponding to the ordinary valence of the metal and sulphur. For example, corresponding to the ordinary valences of potassium (1) and sulphur (2), potassium sulphide has the formula $K_2S$. The polysulphides of potassium have the formulae $K_2S_2$, $K_2S_3$, $K_2S_4$, $K_2S_5$ and are stable up to relatively high temperatures. $K_2S_4$, for example, decomposes at 850° C. Similarly, corresponding to the ordinary valences of barium (2) and sulphur (2), barium sulphide has the formula $BaS$ and forms the polysulphides $BaS_2$, $BaS_3$, $BaS_4$.

In volume 10 of J. W. Mellor's Inorganic and Theoretical Chemistry, it is stated that the thiosulfates, in general, decompose on heating, with formation of sulphur and/or polysulphides. In addition to the thiosulfates of the alkaline earth metal group, several other metals such as copper, zinc, cadmium and the ammonium radical ($NH_4$) form thiosulfates and also numerous combinations of metals form complex thiosulfates such as, for example, sodium potassium thiosulfates ($NaKS_2O_3$). Sodium and potassium thiosulfates, as examples, have been found to give this protective action in experiments. Some thiosulfates, as, for example, $ZnS_2O_3$ and $CdS_2O_3$, decompose at room temperature and can exist only in solution. Calcium thiosulfate decomposes slowly at room temperature. It can, therefore, be said that, dependent on the particular thiosulfate used, decomposition may occur within the range from room temperature up to about 250° C. and even higher. In addition, the decomposition products of many of the thiosulfates exhibit fluorescence when exposed to ultra-violet light. Among these are the decomposition products of both sodium and potassium thiosulfate.

The complex aggregate formed on decomposition of the thiosulfate is thus very rich in sulphur. It probably covers the individual fluorescent particles, acting as a protective film to prevent the reduction of the Zn—Cd—S fluorescent powder, which reduction consists of the removal of sulphur, leaving metallic zinc and cadmium to decrease the fluorescence of the powder. The sulphur, which is one of the decomposition products of the thiosulfates, is believed to be in a very active state. The chemist calls it "nascent" sulphur, and means by this term atomic sulphur.

It has been noted that the decomposition of the sodium and potassium thiosulfate occurs in the temperature range where the glycerine is evaporating (about 100° C. to 290° C.). That is to say, the decomposition products are in their most active state just when the vapor pressure of the reducing agent is greatest. Because this decomposition takes place in this particular range of temperatures it seems likely that there is some prevention of the formation of a reducing atmosphere. It is not likely, however, that the prevention of the reducing atmosphere is as important as the protective action. Of course, in one sense, the protective action is also one of prevention, i. e., the layer immediately in contact with the fluorescent powder prevents the formation at the surface of the powder itself of a reducing atmosphere.

Any volatile organic material, such as a water-soluble member of the dihydric or trihydric alcohol groups, that produces a stable tacky surface and does not leave an organic residue would, theoretically, be a satisfactory substitute for the glycerine but in actual experiments conducted, glycerine (a trihydric alcohol) was the compound which most completely satisfied these conditions. Other materials which were tested suffered from one or the other of these difficulties: (1) when dissolved in water, as in the case of all the binders used, the surface tension of solution is such that it does not readily wet glass and, as a result, the mechanical adhesion of the screen is not as good as with glycerine and it tends to coalesce into larger drops when sprayed onto the supporting member for the screen; (2) the material may not evaporate without leaving an organic residue which carbonizes on baking, thus ruining the screen; (3) in many cases the material causes precipitation of other binder ingredients, particularly the silicates. Materials which are satisfactory but not quite as desirable as glycerine are the dihydric alcohols, such as triethylene glycol and tetraethylene glycol. The amount of glycerine used, however, may vary within quite wide limits and the 50 to 110 parts stated in the formula above are merely the proportions which have been found to give the best working conditions. Satisfactory solutions can be produced using more or less than this amount of glycerine.

In place of sodium silicate, any other water-soluble (at ordinary temperatures) silicate or borate may be used as a permanent binder (that is, one which does not decompose during the baking process).

In preparing a screen on the end wall of a cathode ray tube of well-known form, an aquadag layer is put on first and baked in a temperature of 450° C. and in some cases even higher. If the fluorescent screen is attached to the tube before the aquadag layer is put on and the tube and screen then baked at 450° C. the fluorescent screen tends to oxidize. Hence the aquadag, or other conducting layer, is put on first. The mixture in the formula above is then made up just prior to use, as the potassium thiosulfate acts slowly to precipitate the silicate. A thin film of this cement is applied to the screen surface with an air brush, using a very fine spray and an excess of air to remove the bulk of the water. The phosphor, which may be any well-known fluorescent material but which is preferably a mixture of zinc and cadmium sulphides activated with copper and manganese (in order to produce a white luminescence), then poured over the sticky surface and caused to flow back and forth across the screen. A suitable fluorescent powder, best known in the trade as Patterson No. 66 powder, is manufactured by the Patterson Screen Company. Other suitable fluorescent powders are calcium tungstate or synthetic willemite, although the binder of the present invention is particularly applicable in the prevention of the chemical reduction of the Zn—Cd—S group of sulphurs and in the enhancement of the fluorescence of members of this group. The excess of phosphor is poured out and the coating dried in an oven at 100° to 150° C. for a period of about one-half hour. This temperature range and the period of time are not, however, very critical. The bulb is then baked at from 300° to 400° C. or perhaps even as high as 450° C. for a period of about one hour. Here again the time and temperature are not very critical. This binder, as stated above, produces a fluorescent screen with excellent mechanical properties and which has a superior resistance to the deleterious effects encountered in baking, particularly in the presence of organic vapors, including the vapor from the aquadag coating.

The neck (not shown) is sealed onto the glass member 10 and the tube is then baked in a gentle stream of nitrogen at about 300° C. for from ten to sixty minutes. The tube is then evacuated and may be, if desired, baked after evacuation although the latter step is not essential. The electron gun is then sealed into the tube which is then pumped to the required degree of vacuum, as well known in the art.

It has been discovered that the thiosulfate binder has an additional property of very considerable importance in the case of the Zn—Cd—S group of phosphors. Baking the screen having this binder at temperatures between 300° C. and 450° C. actually increases the brightness of the fluorescence excited by ultraviolet light and by electron bombardment. In the case of ultra-violet excitation, data are available over the complete range of baking temperatures and this effect of enhancement of the fluorescence is greatest for a baking temperature of 350° C. When the screens are baked in air at temperatures above 350° C., Zn—Cd—S phosphors oxidize, and the oxidation is shown by the appearance of yellow cadmium oxide (CdO) which, while it is self-fluorescent, apparently does not fluoresce as brightly as the original powder. Probably also some zinc oxide (ZnO) is formed, which would not be easily observed because of its white color. But even after baking at 450° C. the screen is brighter than before baking. In the case of excitation by electron bombardment the brightest screens have been those subjected to a preliminary baking in air at 350° C., thus confirming the enhancement effect observed under ultra-violet excitation.

A theoretical explanation of the enhancement effect can be given in terms of the decomposition properties of the thiosulfates. Mellor states that the decomposition does not occur completely at a definite temperature and that the decomposition is only complete after prolonged heating at a high temperature, (e. g. six hours at 380° C. for potassium thiosulfate). The decomposition aggregate is then fluorescent. The enhancement may in part be due to the fluorescence of the binder itself. However, it is believed that the greater part of enhancement is due to increase in fluorescence of the Zn—Cd—S phosphor itself.

It is known that copper specifically, and probably atoms such as manganese similar to copper in that they possess small atomic volume, diffuse into Zn—Cd—S phosphors at temperatures above 300° C. (see an article entitled "Luminescence" by N. Riehl in the Faraday Society Discussions for 1938). Because of the much larger atomic volume of sulphur, it is improbable that sulphur does not diffuse through the Zn—Cd—S phosphors except at much higher temperatures. It is even questionable whether zinc and cadmium diffuse, although they probably do in some degree.

The enhancement of the fluorescence is probably due to an increase in the number of fluorescent centers, which are due to the presence of the activating impurities, copper and manganese. It is well known that only a trace of these are added and that too much of the impurity definitely decreases the brightness of the fluorescence, that is to say, decreases the number of fluorescent centers. Therefore, an explanation of the enhancement effect is that excess activator—Cu or Mn—diffuses to the surface and there combines with the active sulphur still being liberated in the decomposition of the binder to form copper or manganese sulphide. Such a small amount of this is formed that it has little or no absorptive effect on the exciting radiation. This is because there is such an extremely small amount, probably less than 0.01 per cent, of activator in the phosphor. The removal of the excess activating impurity increases the number of fluorescent centers, and hence the screen is brighter. Assuming this explanation is correct, it follows that the thiosulfate binder might not always enhance the fluorescence of a phosphor of the Zn—Cd—S group. Whether it does or not depends upon whether in the manufacture of the particular phosphor involved a slight excess of impurity is used. In the usual manufacture of phosphors, however, a slight excess of impurity is frequently present, because the equilibrium composition of the phosphor at the temperature of formation (1100° C. approximately) may differ from that in the range from 300° C. to 450° C. in such a way that a slight excess of impurity is always present at the lower temperature.

There is experimental confirmation of the above explanation. In the first place, it should be pointed out that the copper-activated Zn—Cd—S phosphor fluoresces blue, while the manganese-activated Zn—Cd—S phosphor fluoresces yellow-orange. It is hardly to be expected that enhancement occurs equally for the two components (which together produce the "white" effect). Experimental observation is that the brighter screens appear more blue, which is easily explained by the assumption that enhancement is more effective on the copper-activated phosphor than on the manganese-activated phosphor of the mixture. This emphasizes the statement that the enhancement effect depends very largely on the composition of the particular phosphor being used. Furthermore, the enhancement effect depends on the particular sulphur-rich compound used in the binder. As stated above, the metal in this compound can probably be any one of the alkali or alkaline earth groups or of the ammonium radical. The compound undoubtedly cannot have as a component certain metals such as iron or lead which are known to have deleterious effects on the fluorescence. With different compounds the enhancement may be positive, negative or zero. Certain other metals, such as those commonly used as activators (Cu, Ag, Mn, for example) if present in the binder would have very complicated effects.

A further effect which has been noticed is that the efficiency of the screen in candlepower per watt of bombarding electron beam energy increases continuously with voltage up to 11,000 volts, the highest voltage used in experiments. This effect is in marked contrast to the results obtained using the sulphur binder described in a copending application of C. J. Calbick and J. B. Johnson, Serial No. 327,958, filed April 5, 1940, or the simple sodium silicate binder known to the art, in which maximum efficiencies were observed at 6000 volts and 7000 volts, respectively, and also to the results obtained by Nottingham (reported in the Journal of Applied Physics 10, January 1939, page 73 et seq.) in which a similar white fluorescing sulphide phosphor showed a maximum efficiency at about 8000 volts.

The cause of this decrease in efficiency with the use of other binders may be due to the development of a "sticking" potential, well known in the art, and due to inadequate secondary emission from the phosphor at the higher voltages. The elimination of the decrease with the present binder may be caused by an increase of secondary emission at the higher voltages.

Nottingham made specific experiments to test the secondary emission and states that the decrease in the efficiency is not due to the existence below 10,000 volts of a "sticking" potential. He very tentatively attributes the decrease to an X-ray absorption level of cadmium but this hypothesis appears to be refuted by the observations available on these powders using the thiosulfate binder.

When the white fluorescent Zn—Cd—S powder known to the art as Patterson No. 66 was used with the thiosulfate binder, it was found that it showed increasing efficiency up to a bombarding voltage of 11,000 volts whereas when applied with at least two other binders the efficiency decreases at voltages above 8000 volts. This is a very important feature when it is desired to use very high bombarding voltages, as for example, in the case of projection tubes for television.

In the claims, the term "substance" is intended to be broad enough to include the ammonium radical (NH4). The term "permanent" binding material is intended to cover materials of the group including the water-soluble silicates and borates, that is, materials which do not decompose during the baking process and which act as binding cements. The unstable sulphur compounds, as stated above, decompose and the glycerine or other "tacky" material evaporates.

What is claimed is:

1. A binder for securing fluorescent material to its supporting member comprising a permanent binding material selected from the group consisting of silicates and borates soluble at room temperatures in water, a thiosulphate which is unstable at temperatures below 500° C. of a substance selected from the group consisting of the alkali and the alkaline earth metals and the ammonium radical, water, and a substance selected from the group consisting of the dihydric and trihydric alcohols which are soluble in water at room temperatures to delay evaporation of water from the binder.

2. A binder for securing fluorescent material to its supporting member comprising a permanent binding material selected from the group consisting of silicates and borates soluble at room temperatures in water, a sulphur compound which is unstable at temperatures below 500° C. of a substance selected from the group consisting of the alkali and the alkaline earth metals and the ammonium radical, water, and a material selected from the group consisting of the dihydric and trihydric alcohols which are soluble in water at room temperatures to delay evaporation of water from the binder.

3. A binder for securing fluorescent material to its supporting member comprising an alkali silicate, a sulphur compound which is unstable at temperatures below 500° C. of a substance selected from the group consisting of the alkali and the alkaline earth metals and the ammonium radical, water, and a material selected from the group consisting of the water soluble dihydric and trihydric alcohols, to delay evaporation of water from the binder.

4. A binder for securing fluorescent material to its supporting member comprising a permanent binding material selected from the group consisting of silicates and borates soluble at room temperatures in water, a sulphur compound which is unstable at temperatures below 500° C. of a substance selected from the group consisting of the alkali and the alkaline earth metals and the ammonium radical, water, and glycerine to delay evaporation of water from the binder.

5. A binder for securing fluorescent material to its supporting member comprising a silicate soluble in water, an unstable sulphur compound of a substance selected from the group consisting of the alkali and the alkaline earth metals and the ammonium radical, and glycerine.

6. A binder for securing fluorescent material to its supporting member comprising an alkali silicate, a thiosulphate of a substance selected from the group consisting of the alkali and the alkaline earth metals and the ammonium radical, and glycerine.

7. A binder for securing fluorescent material to its supporting member comprising potassium thiosulfate, sodium silicate, glycerine, and water.

8. A binder for securing fluorescent material to its supporting member made of an alkali thiosulfate 100 parts, an alkali silicate 1½ to 6 parts, glycerine 50 to 110 parts, and water around 400 parts.

9. A binding material for securing fluorescent material to its supporting member made of potassium thiosulfate 100 parts, sodium silicate 1½ to 6 parts, glycerine 50 to 110 parts, and water around 400 parts.

10. In combination, a fluorescent material comprising a mixture of metallic sulphides and a metallic activator, and a binding member comprising a permanent binding material selected from the group consisting of those silicates and borates soluble at room temperatures in water, a sulphur compound which is unstable at temperatures below 500° C. of at least one substance selected from the group comprising the alkali and the alkaline earth metals and the ammonium radical, water, and a substance to delay evaporation of water from the binder, said substance being selected from the group consisting of the water soluble dihydric and trihydric alcohols.

11. In combination, a binder comprising an alkali silicate, an alkali thiosulfate, water, and a substance selected from the group consisting of the water soluble dihydric and trihydric alcohols to delay evaporation from the binder, and a fluorescent material comprising zinc and cadmium sulphides activated with a metal selected from the group consisting of copper, manganese and silver.

12. A material for forming a metallic sulphide fluorescent coating on a supporting member comprising a liquid solution of (1) a material which in dry solid form is capable of acting as a light transmitting cement for fluorescent powder, (2) a liquid material which is non-volatile at certain working conditions of temperature and pressure but volatile at higher temperatures or lower pressures and which retards evaporation of the solvent when said first conditions of temperature and pressure are present, providing time for an even application of fluorescent powder to a coating of the solution on the support before being removed by application of higher temperature or lower pressure and (3) a sulphur compound which at said higher temperature or lower pressure is unstable, whereby a sulphur atmosphere may be formed to prevent the formation of free metal particles from the fluorescent material, and metallic sulphide fluorescent material embedded in said solution.

CHESTER J. CALBICK.
JOHN C. COOK.